United States Patent [19]

Overath et al.

[11] Patent Number: 4,697,258
[45] Date of Patent: Sep. 29, 1987

[54] APPARATUS FOR ENABLING AN AUTOTRACK CIRCUIT OF AN OPTICAL DISC READING APPARATUS DURING THE POSITIONING OF A READ BEAM

[75] Inventors: Hilde M. A. Overath; Martinus P. M. Bierhoff, both of Eindhoven, Netherlands

[73] Assignee: U.S. Philips Corporation, New York, N.Y.

[21] Appl. No.: 719,610

[22] Filed: Apr. 3, 1985

[30] Foreign Application Priority Data

Nov. 21, 1984 [NL] Netherlands ............................ 8403534

[51] Int. Cl.[4] ........................ G11B 21/10; G11B 7/095
[52] U.S. Cl. ........................................ 369/44; 369/46; 369/54; 369/58
[58] Field of Search ................ 369/43, 44, 45, 46, 369/54, 58, 32, 111; 250/201 DF

[56] References Cited

U.S. PATENT DOCUMENTS

| 4,037,252 | 7/1977 | Janssen | 369/46 |
| 4,338,682 | 7/1982 | Hosaka et al. | 369/46 |
| 4,365,324 | 12/1982 | Michaelis | 369/44 |
| 4,539,665 | 9/1985 | Iso et al. | 369/32 |
| 4,544,872 | 10/1985 | Hirano et al. | 369/44 |

Primary Examiner—Raymond F. Cardillo
Assistant Examiner—Robert A. Weinhardt
Attorney, Agent, or Firm—Thomas A. Briody; Jack Oisher; William J. Streeter

[57] ABSTRACT

Apparatus for reading a disc-shaped record carrier with a light beam. A radial positioning apparatus controls the radial position of the light beam spot on the information track of a record carrier. A lock-in system is provided for switching the radial positioning apparatus into a tracking mode when the light spot is positioned to coincide with the information track. The direction of relative radial movement between the light spot and the information track is detected and a first control signal is supplied to initiate radial tracking of the information track when the relative radial movement between the reading beam and the information track changes from an outward movement of the light spot over the track to an inward movement of the light spot over the track. At the instant the transition occurs, the radial positioning apparatus is enabled to permit the read spot to follow the information track.

7 Claims, 7 Drawing Figures (a)

(b)

(c)

(d)

(e)

APPARATUS FOR ENABLING AN AUTOTRACK CIRCUIT OF AN OPTICAL DISC READING APPARATUS DURING THE POSITIONING OF A READ BEAM

The invention relates to an apparatus for reading a disc-shaped record carrier in which information is stored in the form of a track of optically detectable areas. The apparatus comprises:
  a light source for producing a read beam,
  an objective system for focussing the read beam to form a read spot on the record carrier,
  a detection system for detecting the information present in the read beam after it has co-operated with the record carrier,
  radial positioning means for controlling the radial position of the read spot on the information track,
  a lock-in system for switching on the radial positioning means at an instant at which the light spot at least substantially coincides with the information track.

Such an apparatus is for example a compact-disc digital audio player, which at the time of filing of the present application is available from N.V. Philip's Gloeilampenfabrieken under type number CD 303. In this player a selection to be reproduced can be keyed in before the disc is played. For this purpose use is made of the subcode which is interleaved with the digital audio information and which includes inter alia a running indication for the track number being reproduced, an index (part of a "track"), and relative and absolute time. Various known players can be programmed with respect to track number, index and/or time. The keyed-in selection may be stored in a memory for the duration of the playing operation.

SUMMARY OF THE INVENTION

It is the object of the invention to improve the ease of operation of the known apparatus by speeding up the search process for a selected track.

To this end the method is characterized in that the apparatus comprises means for detecting the direction of the relative radial movement between the light spot and the information track and for supplying a first control signal to the lock-in system near the instant at which, if the radial positioning means were inoperative said relative radial movement would change from an outward movement of the light spot over the track to an inward movement of the light spot over the track. The lock-in system is adapted to switch on the radial positioning means if the first control signal is present.

In this respect it is to be noted that in the foregoing and in the following "inward movement" and "outward movement" are to be understood to mean: a radial movement of the light spot towards the centre of the record carrier, and a radial movement of the light spot towards the periphery of the record carrier, respectively. If the light spot were taken as a (stationary) reference, this would mean that in the case of a rotating record carrier the track would travel "outwardly" (i.e. towards the periphery of the record carrier) and "inwardly" (i.e. towards the centre of the record carrier), respectively relative to the light beam. Here it is assumed that the radial tracking is not operative.

For the step in accordance with the invention it must be born in mind that as a result of the radial tracking being switched on at the relevant instant, the light spot travels over the track with an outward movement which is slowed down continually until the track is reached and subsequently followed.

The step in accordance with the invention is based on the fact that in the known CD players locking in to the track is not effected in an optimum manner. If the light spot is found to coincide at least substantially with the information track, the relative movement of the light spot with respect to the track, viewed in a radial direction, which movement is generally caused by an eccentricity in the record carrier for example, the centre hole is slightly off-centred, may be very large, namely so large that the radial positioning means are no longer capable of keeping the light spot on the track. As a result of this, the light spot will come off the track, so that it is necessary to wait until tracking is restored, after which the radial positioning means may again fail to keep the light spot on the track. This "locking in" to the track may take a substantial time, particularly in the case of the lead-in track. This lead-in track contains data relating to the number of tracks and the starting time of each track on the record carrier. If a "compact disc" record is to be played the data from this lead-in track is always read out before a track is reproduced. Since this lead-in track is situated near the centre of the record carrier, where the track has the smallest diameter and the record carrier has the highest speed of revolution, "locking-in" to the track is most difficult at this location. If now the radial positioning means are switched on only at locations where the direction of the movement of light spot relative to the track would be reversed if the radial tracking were inoperative—i.e. at locations where the speed in the radial direction is substantially zero—immediate locking in to the track is possible.

If the radial tracking is not switched on until the instant near the time outward movement of the light spot would change to an inward movement (again assuming that the radial tracking were inoperative) this also ensures that after locking in to the lead-in track, tracking can also be maintained for the first complete revolution of the record carrier.

If locking in to the lead-in track is effected at another instant this will mean that the light spot should travel inwardly over the record carrier for a part of a revolution period of the record carrier. Viewed in the radial direction, the objective system may then be positioned against the stop—which is the extreme initial position of the objective system—so that a radial movement of the objective system is obstructed and, consequently, the track, which extends further inwards, can no longer be followed.

It is to be noted that locking in to a track at the instant at which the relative radial speed of the light spot with respect to the track is low is known per se, see for example U.S. Patent Specification No. 4,330,880 (PHN.9312). However, this specification relates to the radial tracking in a "Laser Vision" player during the rapid seach for a desired program section. There is no problem of locking in to one specific point along a circumferential line of the track in a record carrier with an eccentric hole.

The apparatus may be characterised further in that the means for supplying the first control signal are adapted to derive the first control signal from a second control signal which indicates whether the light spot is positioned on or off the track, and from a third control signal which indicates the relative radial direction of movement of the light spot over the track.

The second and the third control signal may be derived as follows. In an apparatus in which the detection system is capable of deriving a high-frequency data signal from which the information to be reproduced can be recovered, this detection system may also derive also the second control signal from the high-frequency data signal. In an apparatus in which the detection system is capable of deriving a radial-error signal the third signal may be derived for example from said radial-error signal. This is simple because both the high-frequency data signal and the radial-error signal are available anyway in "compact-disc" players. The means for supplying the first control signal may detect a phase shift of the third signal relative to the second signal, and supply the first control signal at the instant at which said phase shift is detected. Both in the most eccentric point and the least eccentric point a phase shift of substantially 180° will occur. It is obvious that the detector means should mainly detect the phase shift around the most eccentric point.

This may be achieved when the means detect those phase shifts for which the third control signal leads the second control signal prior to the phase shift, and the third control signal lags the second control signal after the phase shift.

An embodiment of the invention will now be described in more detail, by way of example, with reference to the accompanying drawings.

DESCRIPTION OF THE PREFERRED EMBODIMENT

Figure 1:
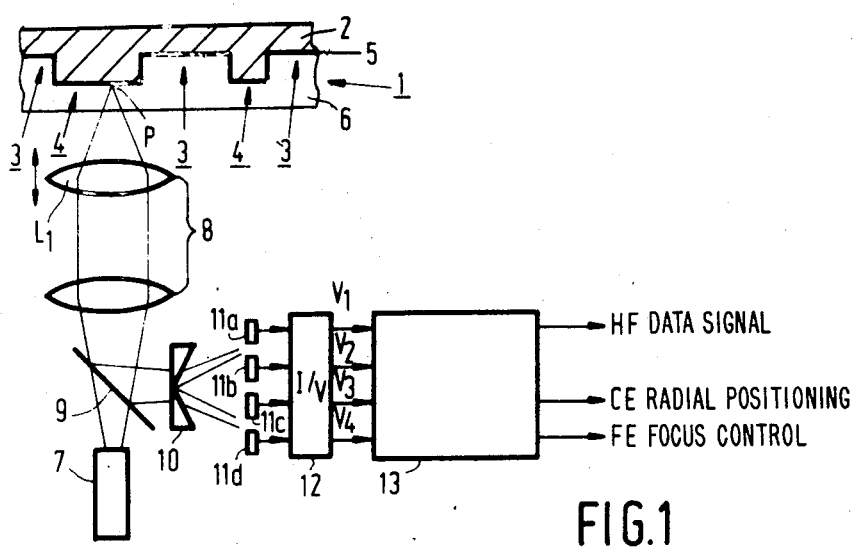
FIG. 1 shows a part of the apparatus in accordance with the invention.

FIG. 1 shows a part of an apparatus in accordance with the invention. This Figure shows schematically a cross-sectional view of a disc-shaped record carrier 1. This record carrier comprises a substrate 2 with a track formed by a structure of pits 3 and non-pits 4. The sectional view has been taken exactly at the location of the track and in the longitudinal direction of the track. The relief structure of tracks is coated with a reflecting layer 5 and a transparent protective coating 6. This information contained in the relief structure of tracks is read in that a laser beam generated by a laser 7 is projected and focused by an objective system 8 to form a light spot P on the track, the reflected beam being projected on a linear array of four optical detectors 11a, 11b, 11c and 11d via a semi-transparent mirror 9 and a beam splitter 10. The currents supplied by the photodetectors are converted into signal voltages $V_1$, $V_2$, $V_3$ and $V_4$ by means of a current-to-voltage converter 12.

In order to ensure a correct read-out the objective system 8 is focussed by moving of the lens $L_1$ of the objective system 8 in upward and downward directions as indicated by the arrow. Control is effected by means of a focuss control signal FE. For the purpose of radial tracking the point of incidence of the laser beam in a radial direction is controlled under command of a radial control signal CE. This is achieved by moving the entire optical system 7, 8, 9, 10, 11 in a radial direction (in a manner not shown) under command of the control signal CE.

The control signals CE and FE are derived from the signals voltages $V_1$, $V_2$, $V_3$ and $V_4$. In addition to the sum $V_1+V_2+V_3+V_4$ for deriving the high-frequency data signal HF, the signal $(V_1+V_4)-(V_2+V_3)$ for deriving the signal FE and the signal $(V_1+V_2)-(V_3+V_4)$ for deriving the signal CE are required for this purpose.

These signals are derived in the block bearing the reference numeral 13.

So far, the description corresponds to that in Philips Technical Review Vo.40, 1982, no. 6, pp. 153–154. The other part of the apparatus will be described with reference to FIG. 7.

Figure 2:
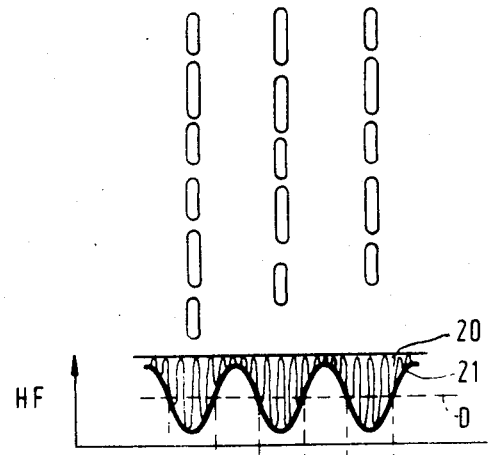
FIG. 2a shows three adjacent rows of pits constituting the track.
FIG. 2b to FIG. 2e show some signal wave forms as a function of the position of the light spot relative to the track.
Figure 2:
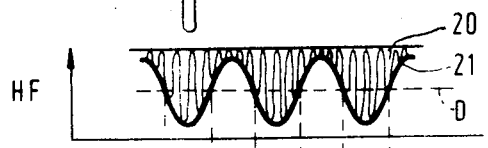
Figure 2:
Figure 2:
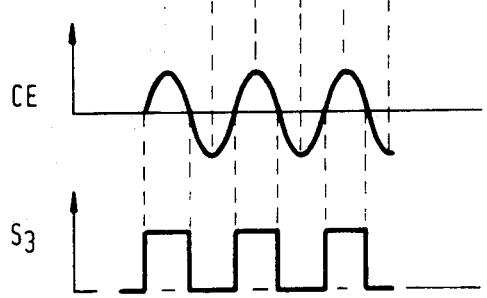
Figure 2:

FIG. 2 shows the wave forms of the high-frequency data signal HF and of the radial-error signal CE as a function of the radial displacement of the objective system and hence of the light spot over the track. FIG. 2a shows three adjacent rows of pits which constitute the track which extends over the record carrier along a spiral path. FIG. 2b shows the high-frequency data signal HF20 whose envelope bears the reference numeral 21. Between the rows of the pits the amount of reflected light is largest. This means that at this location the envelope is largest. However, the modulation depth is smallest at this point. Exactly on the rows the amount of reflected light is smallest. Therefore, the envelope is minimal at this point. The modulation depth is then a maximum. Comparing the envelope signal 21 with a (tracking) threshold D yields a second control signal $S_2$, see FIG. 2c, which is high if the envelope 21 is smaller than the threshold D and which is low if the envelope is larger than the threshold D. A comparison of FIG. 2a with FIG. 2c shows that the signal $S_2$ indicates whether the light spot is on the track or off the track. FIG. 2d shows the radial-error signal CE. This signal becomes positive if the light spot moves off the track to the left and becomes negative if the light spot moves off the track to the right. Thus, if the light spot moves off the track to the left or to the right the radial positioning means will move the object system to the right or to the left under the influence of the signal CE, so that the light spot is again positioned on the track. FIG. 2e shows a signal $S_3$, which is the third control signal and which is derived from the signal CE. The signal $S_3$ goes high if CE is positive and low if CE is negative. The signals $S_2$ and $S_3$ are employed for determining the instant of locking in to the track and, consequently, when the radial positioning means should be switched on.

Figure 3:
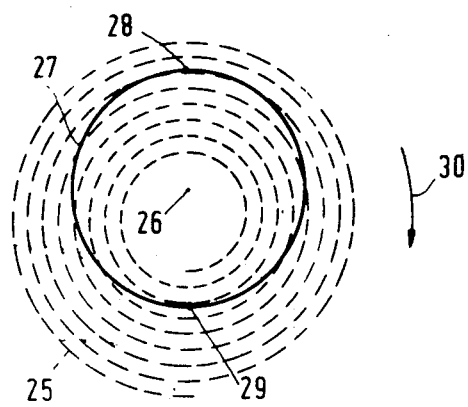
FIG. 3 shows an eccentric record carrier.

FIG. 3 shows the spiral track 25 which extends from the centre towards the periphery of a record carrier.

The record carrier is not symmetrical, i.e. the hole 26 is not located exactly in the centre of the record carrier. If the objective system 8 is in a stationary position against the stop (not shown)—i.e. in its fully inward position—the light spot will described a circular path whose centre is the hole 26 if the record carrier rotates in the direction indicated by the arrow 30. Locking in to the track at a position on the circle 27 other than point 28—which is the most eccentric point on the record carrier and which is situated on the circle—is not possible because from this instant the light spot would have to move inwardly, viewed in a radial direction, which is not possible because the objective system is already positioned against the stop. Moreover, locking in at this point 28 and, generally speaking, also at the diametrically opposite point 29 is very favourable because the light spot has a relative radial speed of (substantially) zero with respect to the track.

Figure 4:
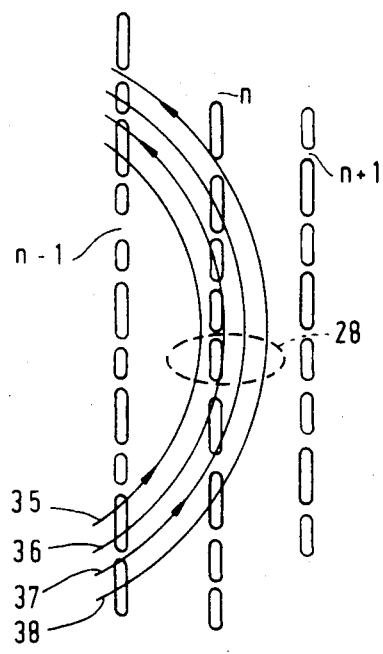
FIG. 4 illustrates the movement of the light spot over the record carrier around the most eccentric point in the case of a stationary objective system and a disabled radial tracking, FIG. 5(a) to FIG. 5(d) each show two signal wave forms derived from the high-frequency data signal and the radial-error signal in the case of a movement of the light spot around the most eccentric point.

FIG. 4 shows the movement of the light spot about point 28 in FIG. 3 when the objective system is stationary and the radial tracking is disabled, for four positions of the objective system. It shows one position for which the $n^{th}$ row of pits is just not reached—curve 35—and three positions for which the $n^{th}$ row of pits is reached—curve 36, 37 and 38. These situations are characteristic of the starting period during which locking in to the lead-in track is to be effected.

Figure 5:
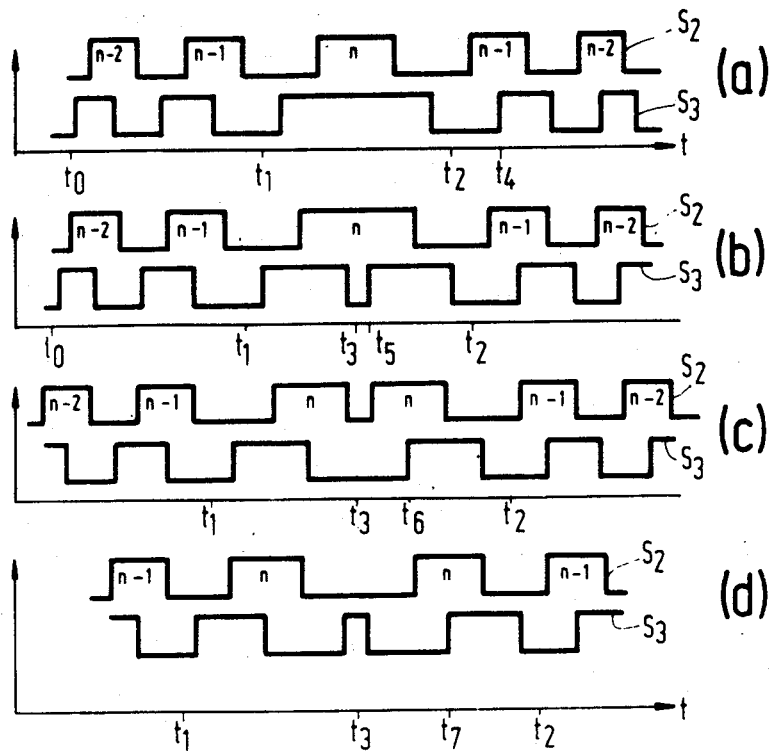

FIG. 5 shows the waveforms of the signals $S_2$ and $S_3$ in these four cases. These waveforms can be derived simply by means of FIG. 2. Before point 28 is reached the light spot first crosses the $(n-2)^{th}$ and $(n-1)^{th}$ row in accordance with curve 35 in FIG. 4. FIG. 5a shows that first $S_3$ and then $S_2$ goes "high" twice between $t=t_o$ and $t=t_1$. The falling edge of $S_3$ appears before that of $S_2$ within this time interval. Thus, $S_3$ may be said to lead $S_2$ by a phase angle of roughly 90°. After the instant $t_2$ in FIG. 5a, i.e. after the light spot has passed position 28, the light spot again travels inwardly over the record carrier, passing the $(n-1)^{th}$ and subsequently the $(n-2)^{th}$ row. Now it is found that $S_2$ leads $S_3$ by a phase angle of roughly 90°. In the time interval between $t=1$ and $t=t_2$ the signal $S_3$ therefore has made a phase shift of roughly 180° relative to the signal $S_2$. This is shown in FIG. 5a in that the signal $S_3$ has no falling edge in the interval between $t=t_1$ and $t=t_2$ when the signal $S_2$ is "high", i.e. at position 28. The waveforms for the situations corresponding to the curves 36, 37 and 38 are identical to the corresponding waveforms in FIG. 5a in the sense that prior to $t=t_1$ and after $t=t_2$ (which are now situated at different points along the time axis) $S_2$ lags $S_3$ and $S_2$ leads $S_3$, respectively, so that within the time interval between $t=t_1$ and $t=t_2$ the signal $S_2$ exhibits a phase shift of substantially 180° relative to the signal $S_2$. In FIG. 5b this phase shift is obtained in that $S_3$ is briefly pulled "low" at the instant $t_3$ during the time that $S_2$ is "high". In FIG. 5c this is achieved in that between the two instants at which the light spot crosses the $n^{th}$ row of pits the signal $S_2$ becomes briefly "low" at the instant $t_3$. In FIG. 5d this phase shift is obtained in that between the two instants at which the light spot crosses the $n^{th}$ row of pits, the signal $S_3$ becomes briefly "high" at the instant $t_3$. In point 29 a similar situation is obtained. Again a phase shift of roughly 180° C. is obtained, so that the signals again coincide before $t=t_1$ and after $t=t_2$.

In accordance with the invention point 28 should now be detected to start the radial tracking from this instant, which is accordance with FIG. 4 would means that locking in would be effected at the row n on the row $n-1$. As the objective system is never positioned exactly against the stop locking in to the row $n-1$ never presents any problem around point 29. At this point the light spot is still capable of following the track because the objective system is not yet positioned against the stop and its movement therefore not obstructed.

Figure 6:
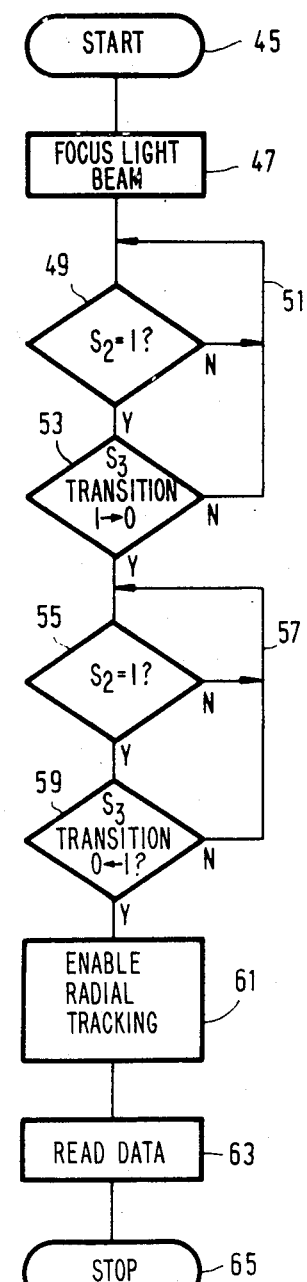
FIG. 6 is a flow chart of a method of determining the instant at which the radial tracking must be switched on, and FIG. 7 shows the other part of the apparatus in accordance with the invention.

FIG. 6 illustrates how locking-in around position 28 can be achieved. The flow chart indicates that after starting of the program in block 45 the light beam is first focused on the record carrier. This is effected in block 47. Subsequently, it is ascertained in block 49 whether the signal $S_2$ is high during a specific time interval. If this is not the case, the program returns to block 49 via branch 51. In the consecutive time intervals in block 49 it is therefore ascertained whether the signal $S_2$ becomes (or is) "high". If $S_2$ is "high" the program proceeds to block 53 in which it is ascertained whether a falling edge is detected in $S_3$ during the time when $S_2$ is "high". Should this be the case, the light spot will be situated in the situation in FIG. 3 on the right-hand half of the circle 27 between points 28 and 29. In FIGS. 5a and 5b this corresponds to a position corresponding to an instant prior to $t=t_1$. For the situation in FIGS. 5c and 5d this corresponds to positions corresponding to an instant prior to $t=t_3$. If no falling edge is detected the light spot is therefore situated (just) past position 28 on the left-hand half of the circle 27 in FIG. 3. Via branch 51 the program then returns to block 49.

If a falling edge is detected, the program proceeds to block 55 in which it is again ascertained whether $S_2$ is "high". If not, the program returns to block 55 via branch 57. If $S_2$ is high, the program proceeds to block 59, in which it is ascertained whether a rising edge appears in $S_3$. If this is not the case, the program returns to block 55 via the branch 57. If a rising edge occurs—at the instant $t_4$ in FIG. 5a, at the instant $t_5$ in FIG. 5b, at the instant $t_6$ in FIG. 5c, and at the instant $t_7$ in FIG. 5d —the program proceeds to block 61 in which the radial tracking is switched on. This means, that, as shown in FIG. 5a, locking in is effected at the row $n-1$ and, as shown in FIGS. 5b, 5c and 5d, at the row n. After locking in reproduction is possible—in block 63—after which the program stops at block 65.

It is obvious that if other signals $S_2$ and $S_3$ are available for deriving the first control signal, for example is one of the signals is available in an inverted form, the instant of locking in is determined in a different way.

Figure 7:
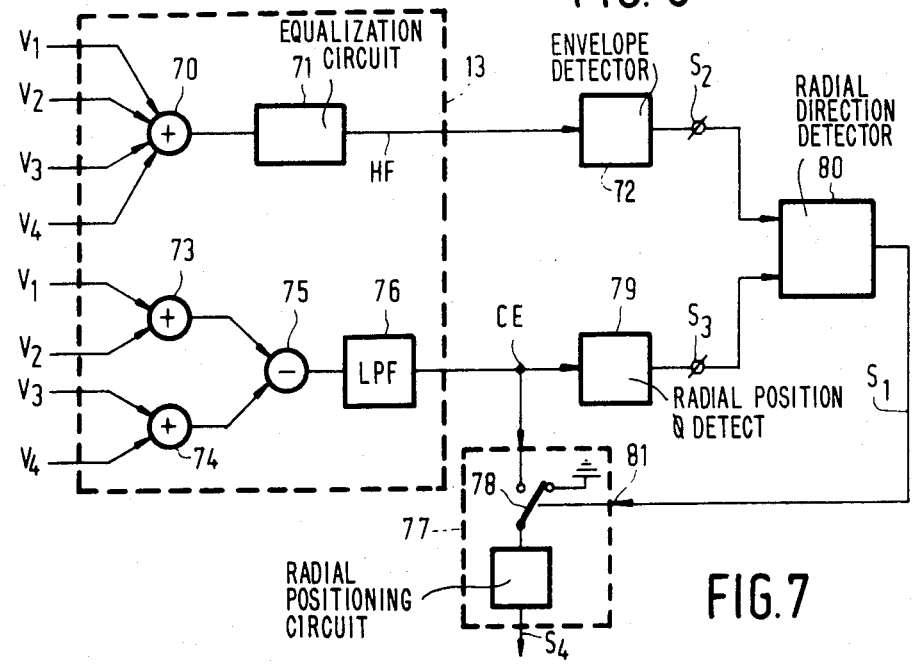

FIG. 7 shows schematically the other part of the apparatus in accordance with the invention as shown in FIG. 1. Starting from the signals $V_1$ to $V_4$, see also FIG. 1, the high-frequency data signal HF is obtained after addition in the signal-combination unit 70 and further processing in 71, in which inter alia equalization is effected, which data signal is applied into an envelope detector and threshold device 72. This element detects the envelope 21 of the high-frequency data signal HF and compares the envelope with the threshold D, see FIG. 2b. Subsequently, the element 72 supplies the signal $S_2$ as its output signal. Moreover, starting from signals $V_1$ to $V_4$, after addition in the signal-combination units 73 and 74, subtraction in the signal combination unit 75 and further processing in 76, in which low-pass filtration is applied, the radial error signal CE is derived. This signal is applied to the radial-positioning means 77, which derive a control signal $S_4$ from said signal CE, which control signal is applied to the control device (not shown) in the form of an actuator, for the optical system 7, 8, 9, 10, 11 see FIG. 1. This control is operative if the switch 78 in the means 77 is closed, i.e. occupies the position not shown. Moreover, the signal CE is applied to a device 79 which, starting from the signal CE, generates a signal $S_3$, see FIG. 2e, and supplies this to its output. The two signals $S_2$ and $S_3$ are applied to means 80 for detecting the direction of the relative radial movement between the light spot P and the information track and for supplying a first control signal $S_1$ around the instant $t_4$ (in FIG. 5a) and $t_5$, $t_6$ or $t_7$ (in FIGS. 5b, 5c and 5d respectively) at which this relative radial movement would be reversed when the radial positioning means were not switched on. At this instant the radial tracking should be switched on. For this purpose the means 80 then produce a "high" signal $S_1$ on the output. This signal $S_1$ is applied to the control input 81 of the unit 77, which constitutes the lock-in system in the present example. This signal then causes the switch 78 to close and keeps the switch closed as long as the signal $S_1$ remains high. If the signal $S_1$ is low the switch 78 is open. A voltage of zero volts is now applied to the radial positioning means, so that no control is effected and the lens system 8 is stationary. In the case of a "high" signal $S_1$ the switch 78 is closed, so that the signal CE is connected and the radial tracking becomes operative.

For an improved control the second control signal $S_2$ is preferably derived not only from the high-frequency data signal HF. The requirement to be met is then that the signal $S_2$ goes "high" if:

(a) the high-frequency data signal HF exceeds the threshold D, (b) the drop-out detector, not shown, (present in a compact-disc player) is not responsive, (c) the high-frequency DC level of the signal HF exceeds a certain other threshold D'. This ensures that the control system is more immune to drop-outs on the disc.

Thus there is described an apparatus for positioning a light beam to track a record carrier and determining an optimum time for enabling radial tracking of said record carrier.

What is claimed is:

1. An apparatus for reading a disc-shaped record carrier in which information is stored in the form of a track of optically detectable areas comprising:

a light source for producing a read beam;

an objective system for focusing the read beam to form a light spot on the record carrier;

a detection system for detecting the information present in the read beam received from the record carrier;

radial positioning means for controlling the radial position of the light spot on the information track; and, a lock-in system for switching on the radial positioning means at an instant at which the light spot at least substantially coincides with the information track comprising means for detecting a direction of the relative radial movement between the light spot and the information track, and for supplying a first control signal to the lock-in system at substantially the instant during which when the radial positioning means is inoperative, said relative radial movement changes from an outward movement of the light spot over the track to an inward movement of the light spot over the track, whereby the radial positioning means is enabled by the first control signal.

2. An apparatus as claimed in claim 1, wherein the means for supplying the first control signal derives the first control signal from a second control signal which indicates whether the light spot is positioned on or off the track, and from a third control signal which indicates the relative radial direction of movement of the light spot over the track.

3. An apparatus as claimed in claim 2, in which the detection system derives a high-frequency data signal from which the information to be reproduced can be recovered and derives the second control signal from the high-frequency data signal.

4. An apparatus as claimed in claim 2 wherein the detection system derives a radial-error signal and derives the third control signal from the radial-error signal.

5. An apparatus as claimed in claim 3, wherein the means for supplying the first control signal detects a phase shift of the third signal, relative to the second signal and supplies the first control signal at the instant at which said phase shift is detected.

6. An apparatus as claimed in claim 5, wherein the means for supplying the first control signal detects those phase shifts for which the third control signal leads the second control signal prior to the phase shift, and the third control signal lags the second control signal after the phase shift.

7. An apparatus as claimed in claim 6, wherein the phase shift is roughly 180° C.

* * * * *